(12) United States Patent
Wong

(10) Patent No.: US 9,356,843 B2
(45) Date of Patent: May 31, 2016

(54) FLOW SYSTEMS AND METHODS

(75) Inventor: Kai Wong, Saratoga, CA (US)

(73) Assignee: Symantec Corporation, Mountain View, CA (US)

(*) Notice: Subject to any disclaimer, the term of this patent is extended or adjusted under 35 U.S.C. 154(b) by 1052 days.

(21) Appl. No.: 12/610,165

(22) Filed: Oct. 30, 2009

(65) Prior Publication Data

US 2011/0103239 A1 May 5, 2011

(51) Int. Cl.
*H04L 12/26* (2006.01)

(52) U.S. Cl.
CPC ............ *H04L 43/026* (2013.01); *H04L 43/106* (2013.01)

(58) Field of Classification Search
USPC .......................................... 370/252
See application file for complete search history.

(56) References Cited

U.S. PATENT DOCUMENTS

| | | | |
|---|---|---|---|
| 6,546,548 B1* | 4/2003 | Berry et al. ................... | 717/128 |
| 7,742,414 B1* | 6/2010 | Iannaccone ............ | H04L 69/04 |
| | | | 370/231 |
| 2005/0235318 A1* | 10/2005 | Grauch et al. .................. | 725/46 |
| 2007/0011317 A1* | 1/2007 | Brandyburg et al. ......... | 709/224 |
| 2009/0144414 A1* | 6/2009 | Dolisy .......................... | 709/224 |
| 2009/0327903 A1* | 12/2009 | Smith et al. ................... | 715/737 |
| 2010/0226373 A1* | 9/2010 | Rowell et al. ............ | 370/395.31 |
| 2010/0246593 A1* | 9/2010 | Belanger et al. .............. | 370/419 |

* cited by examiner

*Primary Examiner* — Adnan Baig
(74) *Attorney, Agent, or Firm* — Wilmer Cutler Pickering Hale and Dorr LLP

(57) ABSTRACT

Systems and methods for process flow tracking are presented. In one embodiment, a flow method comprises collecting records associated with flow for post analysis; performing a flow connection process associated with the flow, wherein the flow connection process examines information in a hash table and connects flow segments based upon connect ID; and performing a presentation process in which the flow is visualized, searched and traversed. In one exemplary implementation, a flow connection process utilizes a hash table that draws a correlation between the connect ID and a connect-start record or a connect-end record.

25 Claims, 16 Drawing Sheets

300

310
Writing a trace record.

320
Collecting records for post analysis.

330
Performing a flow connection process to establish links on a single pass.

340
Visualizing, searching and traversing a process flow.

FIG 3

| FLOW Hash Table 400 | | |
|---|---|---|
| 410 Thread ID | 411 Thread ID | 412 Thread ID |
| 420 Trace Record | 421 Trace Record | 422 Trace Record |

FIG 4

| END-LOCAL Hash Table 500 | | |
|---|---|---|
| 510 Connect ID | 511 Connect ID | 512 Connect ID |
| 520 Connect-end Record | 521 Connect-end Record | 522 Connect-end Record |

FIG 5

| END Hash Table 600 | | |
|---|---|---|
| 610 Connect ID | 611 Connect ID | 612 Connect ID |
| 620 Connect-end Record | 621 Connect-end Record | 622 Connect-end Record |

FIG 6

| START Hash Table 700 | | |
|---|---|---|
| 710 Connect ID | 711 Connect ID | 712 Connect ID |
| 720 Connect-start Record | 721 Connect-start Record | 722 Connect-start Record |

910 Performing a FLOW hash table analysis.

Found ← 911 Search FLOW hash table for a record with same thread ID. → Not Found

912 The found record is removed from the FLOW hash table and then connected to A using the flow links.

920 Performing a START hash table analysis.

Found ← 921 Search START hash table for a record with same connect ID → Not Found

922 If found the connect-start record is removed from the START hash table. The flow link is followed from the found record to the end of flow. (See Detailed Description)

930 Performing an END hash table analysis.

Found ← 931 Search END hash table for a record with same connect ID. → Not Found

932 connect-end records with matching connect IDs are connected to the record (A) with the fan links. If more than one connect-end records are found, this is a fan out case and they are removed from the END hash table; otherwise it is left alone. (See Detailed Description)

940 Retrieve next record

FIG 9

FLOW SYSTEMS AND METHODS

FIELD OF THE INVENTION

The present embodiments relate to the field of processing flow tracking and debugging.

BACKGROUND OF THE INVENTION

Electronic systems and circuits are often utilized in a number of applications to achieve advantageous results. Numerous electronic technologies such as computers, video equipment, and communication systems facilitate increased productivity and cost reduction in analyzing and communicating information in most areas of business, science, education and entertainment. Frequently, these activities involve vast amounts of information and significant resources are expended developing the information. Complex systems and vast amounts of information utilized in these activities can be susceptible to problems in operating in the field and trouble shooting is often very difficult.

Problems that can arise during production activities and can be relatively unique to particular production systems. When problems develop one of the most typical tasks in finding a solution is attempting to gathering sufficient and relevant information. However, conventional approaches to finding solutions often consume vast amount of resources and are inconvenient. For example, traditional core dump approaches usually are very disruptive and usually involve bring down all nodes in a cluster at the same time. This often shuts down production. Even when core dumps are utilized they typically involve numerous manual hours expended correlating and navigating the core dump data among multiple nodes. There can be data confidentiality concerns that restrict the transfer of information in the field. The analysis can also be limited. Core dumps typically represent a snapshot and even if problems are found the sequence of events leading to the problems are not available.

SUMMARY

Systems and methods for facilitating process flow tracking and debugging are presented. In one embodiment, a flow method comprises collecting records associated with flow for post analysis; performing a flow connection process associated with the flow, wherein the flow connection process examines information in a hash table and connects flow segments based upon connect ID; and performing a presentation process in which the flow is visualized, searched and traversed. In one exemplary implementation, a flow connection process utilizes a hash table that draws a correlation between the connect ID and a connect-start record. The hash tables can draw a correlation between the connect ID and a connect-end record. The hash table can be a FLOW hash table for event records that connect forward to a record in a same node with a same thread ID. The hash table can be an END_LOCAL hash table for a connect-end record that connects forward to another connect-end record in the same node. The hash table can be an END hash table for connect-end records that connect backward to one or more connect-start records in a same or different node.

In one embodiment, the flow connection process includes selecting a current record for connection analysis; performing a merge process; determining a record file type; a connect-start resolution process is performed if the current record is a start record; a connect-end resolution process is performed if the current record is an end record; and a regular record resolution process is performed if the current record is a regular record. In one embodiment a record with the lowest timestamp among multiple CPUs is selected as the current record for connection analysis. In one exemplary implementation, a node's multiple CPU files are merged into one file with records in timestamp order.

In one embodiment, a computer readable storage medium having stored thereon, computer-executable instructions that when executed by a computing device cause the computing device to perform a method comprising collecting records associated with flow for post analysis; performing a flow connection process associated with the flow, wherein the flow connection process examines information in a hash table and connects flow segments based upon connect ID; and performing a presentation process in which the flow is visualized, searched and traversed. In one exemplary implementation, a flow connection process utilizes a hash table that draws a correlation between the connect ID and a connect-start record. In one exemplary computer-executable instructions cause the computing device to perform a flow method.

In one embodiment, a system comprising a computer system having a processor coupled to a computer readable storage media and executing computer readable code which causes the computer system to perform a method including collecting records associated with flow for post analysis; performing a flow connection process associated with said flow, wherein said flow connection process examines information in a hash table and connects flow segments based upon connect ID; and performing a presentation process in which said flow is visualized, searched and traversed. In one exemplary the computer system performs a flow method.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

FIG. 3 is a flow chart of an exemplary flow process in accordance with an embodiment.

FIG. 4 is a block diagram of an exemplary FLOW hash table in accordance with an embodiment.

FIG. 5 is a block diagram of an exemplary END_LOCAL hash table in accordance with an embodiment.

FIG. 6 is a block diagram of an exemplary END hash table in accordance with an embodiment.

FIG. 7 is a block diagram of an exemplary START hash table in accordance with an embodiment.

FIG. 9 is a flow chart of connect-start resolution process in accordance with an embodiment.

DETAILED DESCRIPTION

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, it will be obvious to one ordinarily skilled in the art that the present invention may be practiced without these specific details. In other instances, well known methods, procedures, components, and circuits have not been described in detail as not to unnecessarily obscure aspects of the current invention.

The present systems and methods facilitate efficient and effective process flow tracking. Present systems and methods facilitate cluster process flow tracking and debugging. Distributed kernel events can be tracked, analyzed and visualized on demand for enhanced serviceability. The features can be provided with very low overhead and without patching a production. Event flows can be generated in a single pass through each node's trace records, while merging each node's multiple trace files into one. The systems and methods allow traced program execution events to be connected into control flows that may split or join with minimal memory requirements. In one exemplary implementation, the flow tracking does not depend on the number of trace records or the number of nodes in a cluster.

In some embodiments, a user places enough probes to obtain the necessary data the user wishes to access. It is not necessary to trace every function call in order to connect events in a flow. In one embodiment, if two adjacent records show the same thread ID, the two events are automatically connected into a flow. These connections can be made with minimal or no user input.

It is appreciated that events may flow across threads and/or across nodes. For example, a work item may be placed into a work queue by one thread and later picked up by another tread. Similarly, a work request may be sent as a message from one node and be received and processed by another node. In one embodiment, additional information that a user places in a trace record can be utilized to indicate a type of connection (e.g., a connect-start, a connect-end, etc.) and facilitate connection of such trace records (e.g., a connect-start record, a connect-end record, etc). In one embodiment a trace record includes a connect ID. Trace records (e.g., a connect-start record, a connect-end record, etc) can be included at any point in a program and utilized to collect information.

Figure 1:
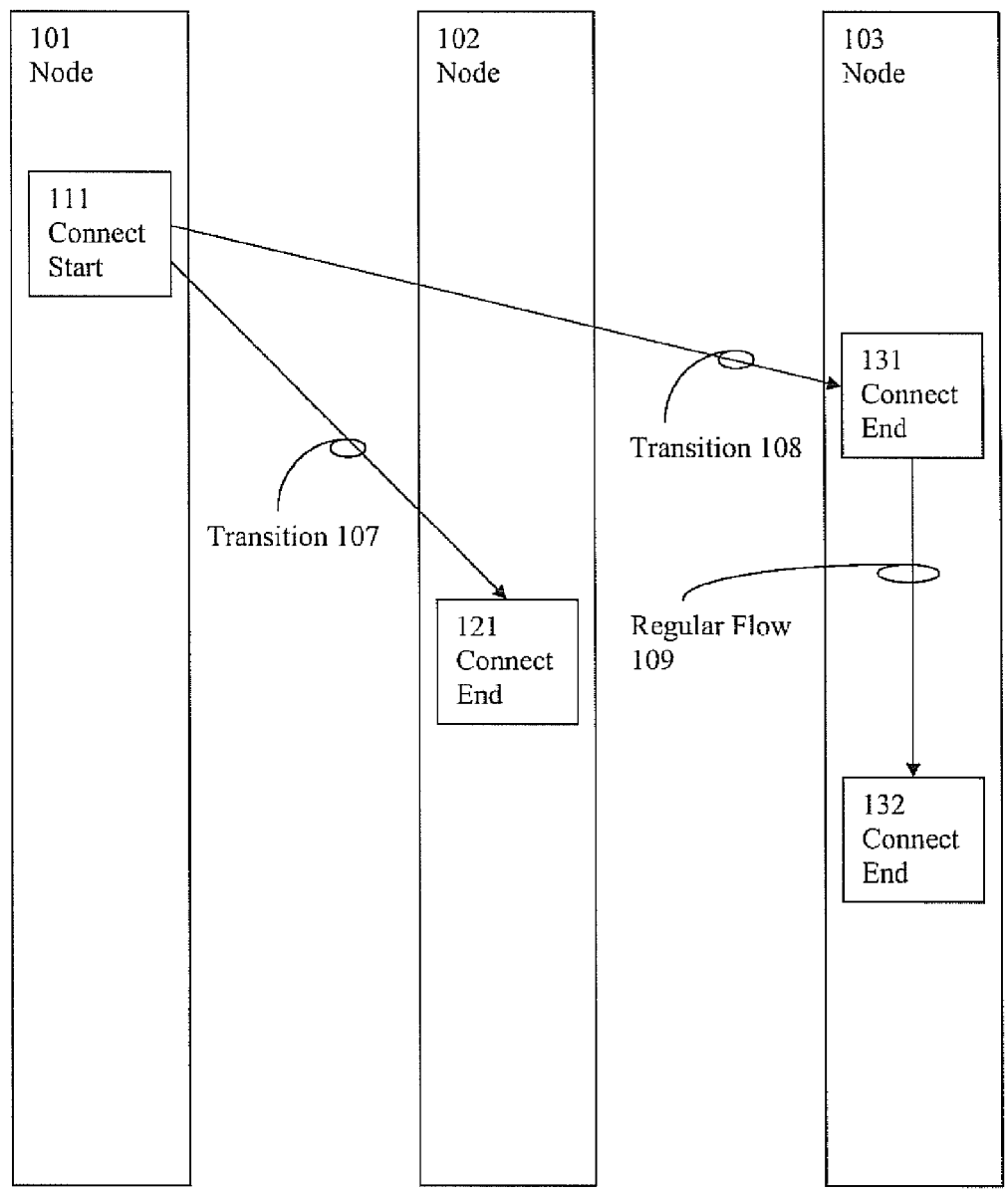
FIG. 1 is a block diagram of an exemplary process flow in accordance with one embodiment.

FIG. 1 is a block diagram of an exemplary process flow 100 in accordance with one embodiment. Process flow 100 includes events occurring on nodes 101, 102 and 103. Process flow 100 can include transitions between nodes. For example, process flow 100 includes transition 107 between nodes 101 and 102 and transition 108 between nodes 101 and 103. In one embodiment, data structures are utilized to facilitate indication of transition connections. In one embodiment, a connect-start record 111 begins a process segment on node 101. It is appreciated that a connect-start record can flow to multiple connect-end records. For example, the connect-start record 111 flows to connect-end records 121 and 131. Similarly, a connect-end record can receive flows from multiple connect-start records. It is also possible for process flow 100 to include regular flows. For example, node 103 includes regular flow 109 from connect-end record 131 to connect-end record 132

Present systems and methods can support a fan out of an event flow from one event to multiple sub-flows. For example, a node may multicast a message to multiple nodes, making multiple requests. Similarly, present systems and methods can support a fan in of multiple event flows converging into one flow. For example, a main thread waits on a barrier until the multiple requests/subtasks are completed. To support an arbitrary large degree of fan-out (for example, in a large cluster, a node may broadcast a message to hundreds, if not thousands of nodes) or fan-in, the space used for storing the references (or locations) of the children events of a fan-out from a parent event or the reference of the parents of a fan-in is dynamically allocated as needed.

The present systems and methods can facilitate flow connection with only one pass through each node's trace records, while merging each node's multiple trace files into one. Thus during processing there can be a child event without the parent event of a cross-node flow or vice versa. Ancestors of a fan out need to be differentiated from descendants of the fan out because the oldest descendant of each fanned-out flow wants to connect only to the youngest ancestor of the main flow (before the fan out). Without such a differentiation, a descendant of a fan out may, for example, connect by mistake to another descendant of the fan out, mistaking that descendant as the youngest ancestor of the fan out.

Present systems and methods can use a bit in a trace record to differentiate two types of records (e.g., connect-start record, connect-end record, etc.). For ancestors of a fan out, the events can be recorded using connect-start records while for descendants of a fan out, connect-end records can be used. There can be multiple connect-start records with the same connect ID. Similarly, there can be multiple connect-end records with the same connect ID. Multiple connect-end records can be added on the receiving side of a multicast message without paying attention to which one will be the oldest descendant. Present systems and method sort them out and make the connection properly. Similarly multiple connect-start records can be added at will. A similar approach can be utilized to differentiate the ancestors of a fan-in (e.g., using connect-start records, etc.) from its descendant (e.g., connect-end, etc.).

Figure 2:
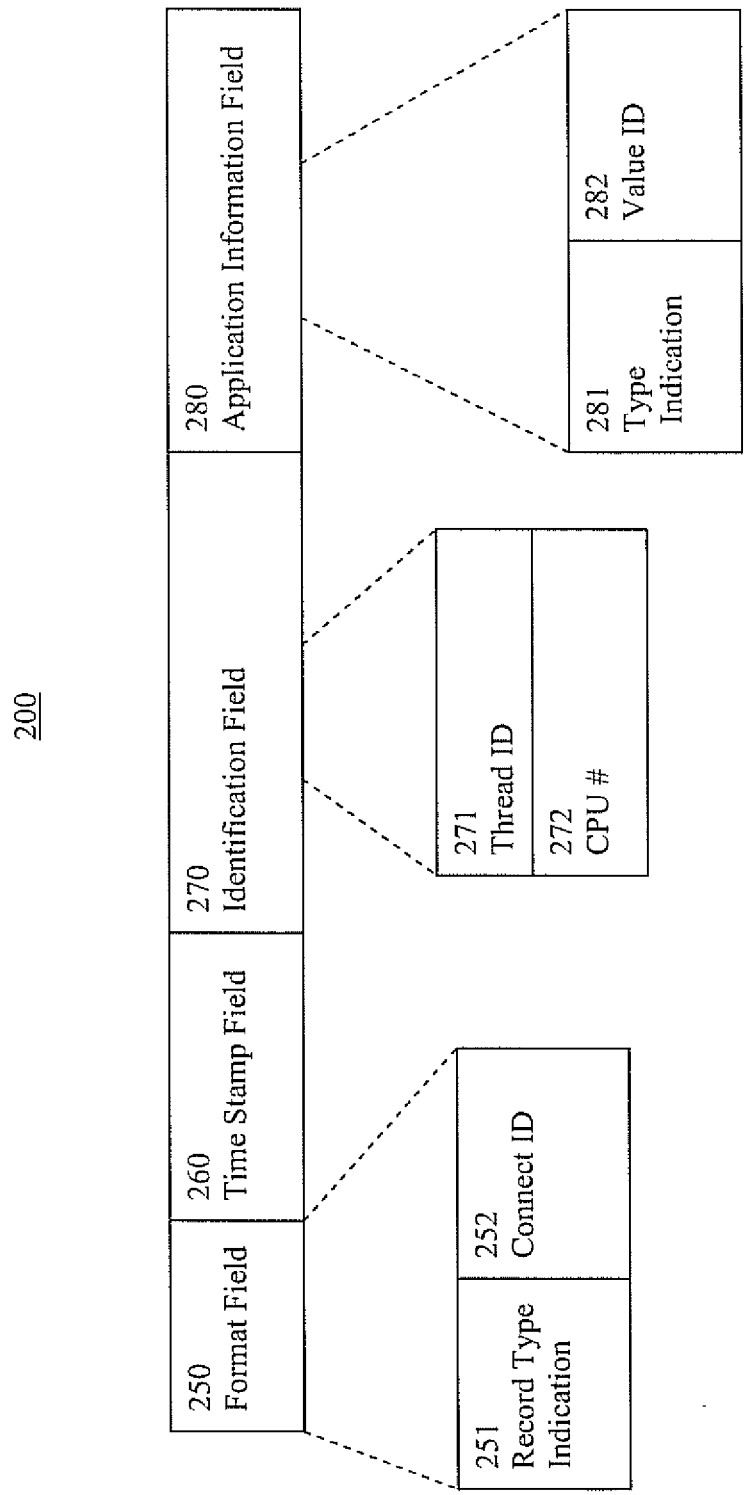
FIG. 2 is a block diagram of an exemplary trace record configuration in accordance with one embodiment.

FIG. 2 is a block diagram of an exemplary trace record 200 configuration in accordance with one embodiment. Trace record 200 includes format field 250, timestamp field 260, identification field 270 and application information field 280. Format field 250 indicates what kind of trace record this is. In one embodiment a trace record can be a regular trace record, a connect-start trace record, or a connect-end trace record. Within the format field there is a record type indication field 251 that indicates the record type (e.g. normal record, a connection start record, a connection end record, etc.). Connect-start records and connect-end records include a connect ID field 252 for indicating a connect ID. Timestamp field 260 includes a timestamp indication. Identification field 270 includes identification information. The identification information can include thread identification field 271 and CPU identification field 272. Application information field 280 includes application dependent information. The application information can include a type—value pair in a type field 281 and a value field 282.

In one embodiment, the connect ID from a trace record is utilized to connect to other records with the same connect ID. By logging a common value observable by probe points that are not on the same thread as the connect ID, these events can be connected in a flow. For example, for probe points dealing with a specific message, a message ID can be used if available. If the existing protocol does not use a message ID, an unused field in a message or a new field can be utilized to send the connect ID so that both the sender node and the receiver node log this for connecting the flow. This connect ID can simply be a random number generated by the sender or just timestamp seen by the sender. In the case of queuing, the address of the queued entry can be logged as the connect ID.

FIG. 3 is a flow chart of an exemplary flow process 300 in accordance with an embodiment. In one embodiment, the flow process facilitates traversal and analysis of a program flow. In one exemplary implementation, the flow process is utilized for debugging.

In block 310, a trace record is written. In one embodiment, there is a regular record, a connect-start record, and a connect-end record. In one exemplary implementation the trace record includes a bit which indicates the type of trace record. In one embodiment a logger includes a set of APIs that can be called to log a trace record. In one exemplary implementation, when logging is disabled, the logger returns immediately to the caller. When logging is already enabled, the logger checks the filters, and if permitted, logs the given trace records to per-CPU pre-allocated circular kernel-space memory buffers so as to minimize interference.

In block 320, collect records for post analysis. In one embodiment, records can be distributed in various locations during run time and they are collected in a single location for post analysis.

In block 330, a flow connection process is performed. In one embodiment, a flow connection process utilizes data structures that draw a correlation between the connect ID and a record (e.g., connect-start record, connect-end record, etc.). The flow connection process examines the information in the data structures and connects flow segments based upon the connect ID and the thread ID. In one embodiment the data structures are hash tables.

In block 340, the flow is visualized, searched and traversed for more analysis and more information. In one embodiment, a presentation of the process flow is generated. In one embodiment, a graphical user interface for interacting with and depicting a process flow is generated. In one exemplary implementation, records are display in text for human consumption. The presentation can facilitate forward and backward navigation through the flow using the flow or fan links, searching for records with certain attributes (e.g., that it relates to lock A or whatever entity type and value pair a user desires, etc.), filtering unwanted record, querying the elapsed time between any two selected events, and graphically displaying the event flows to identify anomalies.

FIG. 4 is a block diagram of an exemplary FLOW hash table 400 in accordance with an embodiment. This is a hash table for event records looking to connect forward to a record in the same node with the same thread ID. The table is keyed by or searchable by thread IDs. FLOW hash table 400 includes thread ID fields 410 through 412 and trace record references 420 through 422. In one embodiment, if there are multiple records with the same thread ID, only the last in time is kept. In one exemplary implementation, FLOW hash table 400 is cleared when the processing of trace records from each node is finished.

FIG. 5 is a block diagram of an exemplary END_LOCAL hash table 500 in accordance with an embodiment. This is a hash table for connect-end records looking to connect forward to another connect-end record in the same node. This table is keyed by or searchable by connect IDs. END_LOCAL hash table 500 includes connect ID fields 510 thorough 512 and connect-end record references 520 through 522. In one embodiment, if there are multiple connect-end records with the same connect ID, only the last in time is kept. This table is also cleared when the record processing is finished for each node. This table facilitates connection of events that have access to the same connect ID (e.g., different routines that process the same received message) without having to log additional records whenever the flow passes from one thread to another.

FIG. 6 is a block diagram of an exemplary END hash table 600 in accordance with an embodiment. This is a hash table for connect-end records looking to connect backward to one or more connect-start records in the same or different node. This table is keyed by or searchable by connect IDs. END hash table 600 includes connect ID fields 610 thorough 612 and connect-end record references 620 through 630. In one embodiment if there are multiple connect-end records from the same node with the same connect ID, only the first in time is kept. In one embodiment, up to one connect-end per node can be kept in the hash table with the same connect ID. The END hash table facilitates performance of the flow connection in one pass. For example, some connect-end records may not have seen a corresponding connect-start record from another node. It is appreciated that a single connect ID can be associated with multiple connect-end records. For example, connect ID 610 is associated with connect-end records 620 and 630.

FIG. 7 is a block diagram of an exemplary START hash table 700 in accordance with an embodiment. This is a hash table for connect-start records looking to (a) connect forward to one or more connect-end records and (b) connect forward to another connect-start record in the same node. This table is keyed by or searchable by connect IDs. START hash table 700 includes connect ID fields 710 thorough 712 and connect-start record references 720 through 722. In one embodiment, if there are multiple connect-start records from the same node with the same connect ID, only the last in time is kept. Similar to the END_LOCAL hash table, the START hash table facilitates connection to ancestor events that log the same connect ID (e.g., different routines that preprocess a message before sending it out) without having to log additional records whenever the flow passes from one thread to another. Also similar to the END hash table, the START hash table enables connect-start records to be connected later to connect-end records. It is appreciated that a single connect ID can be associated with multiple connect-start records. For example, connect ID 710 is associated with connect-start records 720 and 730.

In one embodiment flow connections are bidirectional, which enables the navigation function to move both forward and backward in flow when looking for events and a specific flow. In one exemplary implementation two types of links (e.g., "flow" and "fan") are further distinguished in the data structures. Normally, a parent record connects to a child record using the flow-forward link embedded in a parent record and the flow-back link on the child record. In one exemplary implementation, 1 to 1 connections can be connected this way regardless whether the connection is due to a matching thread ID or connect ID when no fan in or fan out is involved.

A fan out connect-start record connects to its fan out children using one or more fan forward links whose storage is dynamically allocated. Each such link is connected to a fan back link of the child connect-end record. This fan out connect-start record may in addition connect using a flow-forward link (embedded on the parent record) to a child event on the same node. For example, a routine may broadcast a request to multiple nodes. Each recipient node, including itself, generates a flow of events in the process of handling the request. The sender simultaneously may continue further processing of the request in its main thread (e.g., say the request in the table, etc.). A fan forward link plus a local flow-forward link is utilized to track the multiple flows.

Figure 12:
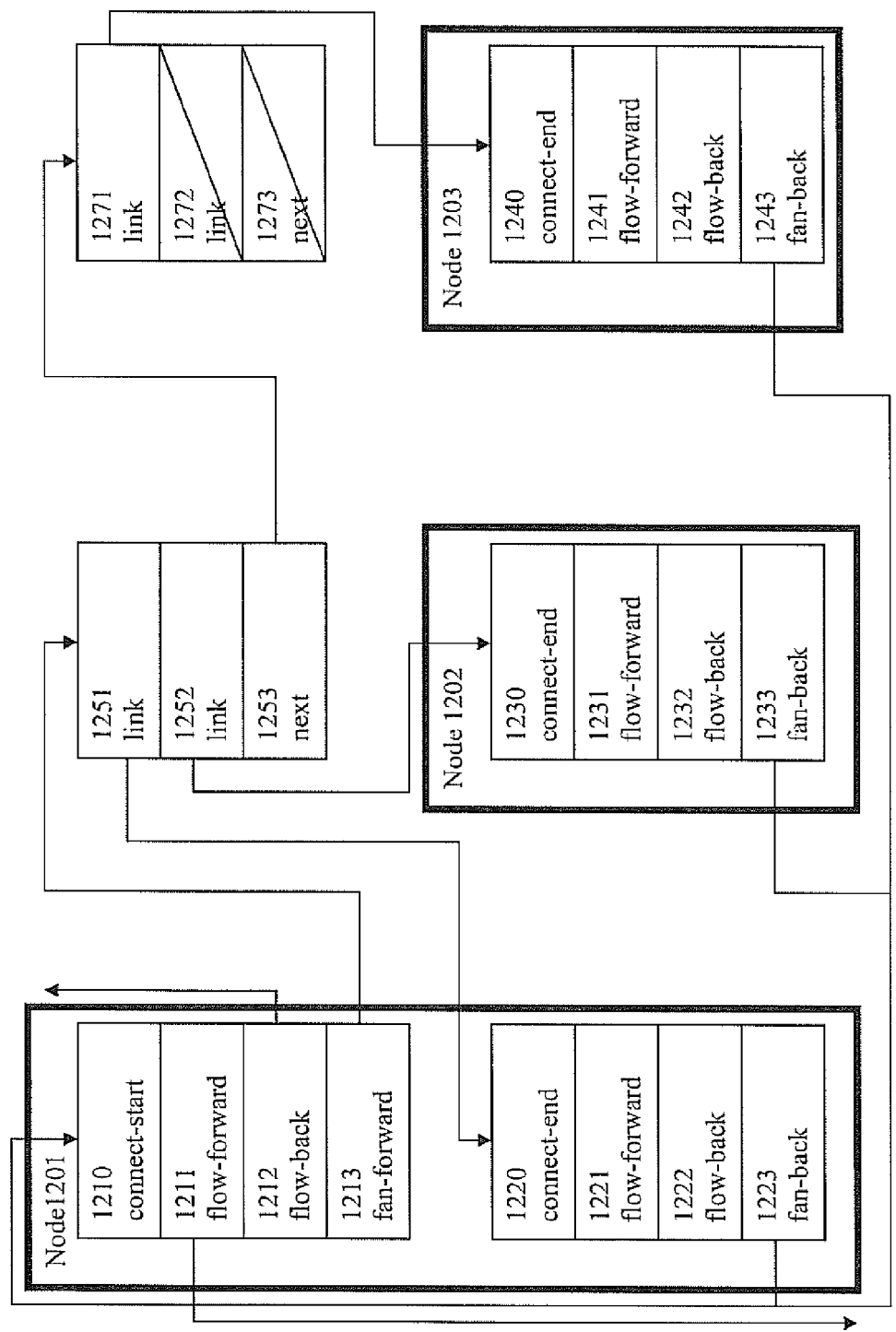
FIG. 12 is a block diagram of an exemplary fan out in accordance with one embodiment.

FIG. 12 is a block diagram of an exemplary fan out in accordance with an embodiment. Node 1201 includes connect-start 1210, flow-forward 1211, flow-back 1212, and fan-forward 1213. Node 1201 also includes connect-end 1220, flow-forward 1221, flow-back 1222, and fan-forward 1223. Node 1202 includes connect-end 1230, flow-forward 1231, flow-back 1232, and fan-forward 1233. Node 1203 includes connect-end 1240, flow-forward 1241, flow-back 1242, and fan-forward 1243. Fan-forward 1213 is coupled to link 1251, link 1252 and next 1253 which are coupled to connect-end 1220, connect-end 1230 and link 1271 respectively. Link 127 is coupled to connect-end 1240. Fan-backs 1223, 1233 and 1243 are coupled to connect-start 1210. Link 1272 and next 1273 are null.

Figure 13:
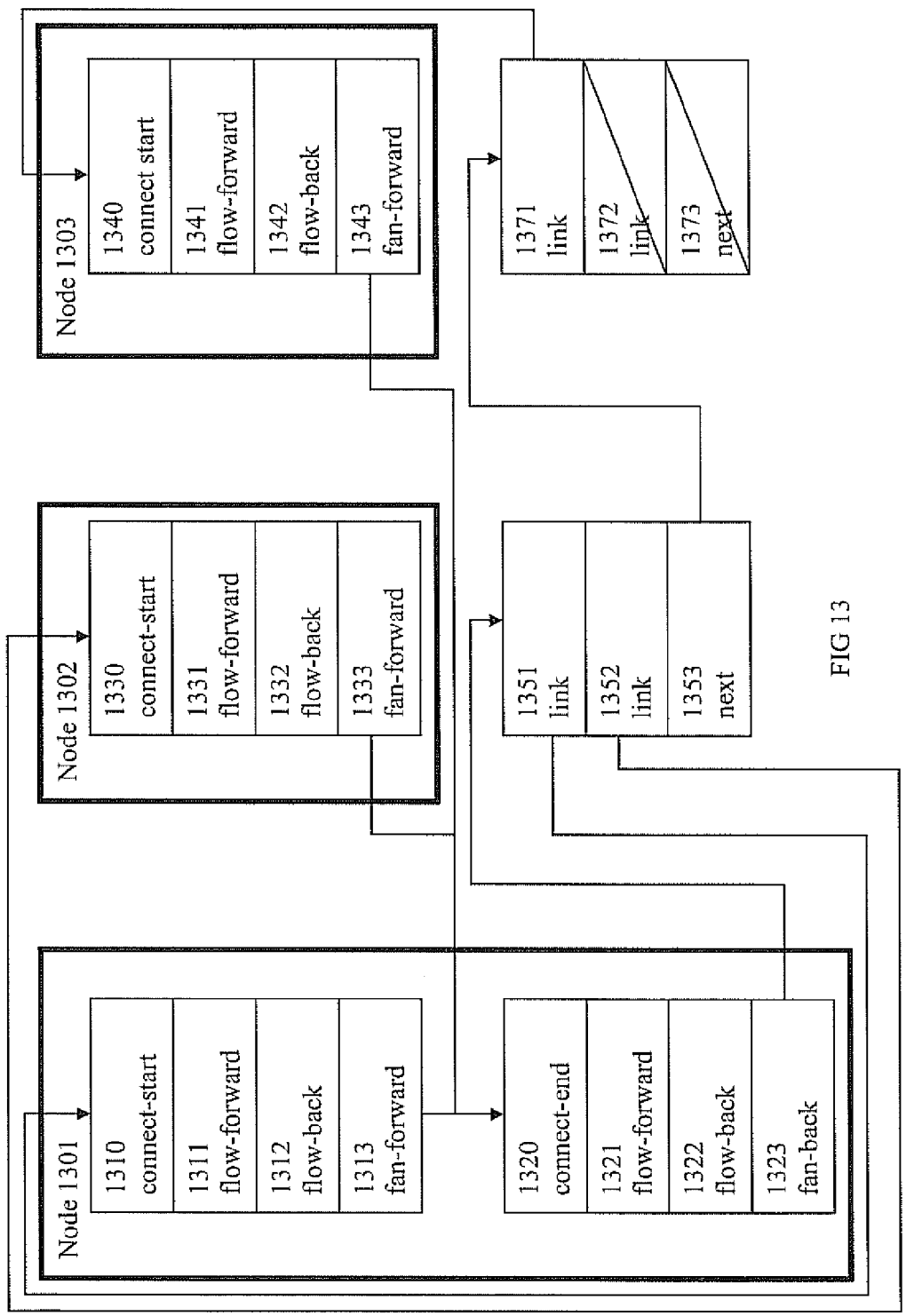
FIG. 13 is a block diagram of an exemplary fan in accordance with one embodiment.

Similarly, a fan-in connect-end record could use one or more fan-back links (e.g., dynamically allocated) to connect to the fan-forward links of its parent. FIG. 13 is a block diagram of an exemplary fan in accordance with an embodiment. Node 1301 includes connect-start 1310, flow-forward 1311, flow-back 1312, and fan-forward 1313. Node 1301 also includes connect-end 1320, flow-forward 1321, flow-back 1322, and fan-forward 1323. Node 1302 includes connect-start 1330, flow-forward 1331, flow-back 1332, and fan-forward 1333. Node 1303 includes connect-start 1340, flow-forward 1341, flow-back 1342, and fan-forward 1343. Fan-forward 1313, 1333 and 1334 are coupled to connect-end 1320. Fan-back 1323 is coupled to link 1351, 1352 and next 1353 which are coupled to connect-start 1310, connect-start 1330 and link 1371 respectively. Link 1371 is coupled to connect-start 1340. Link 1372 and next 1373 are null.

Figure 8:
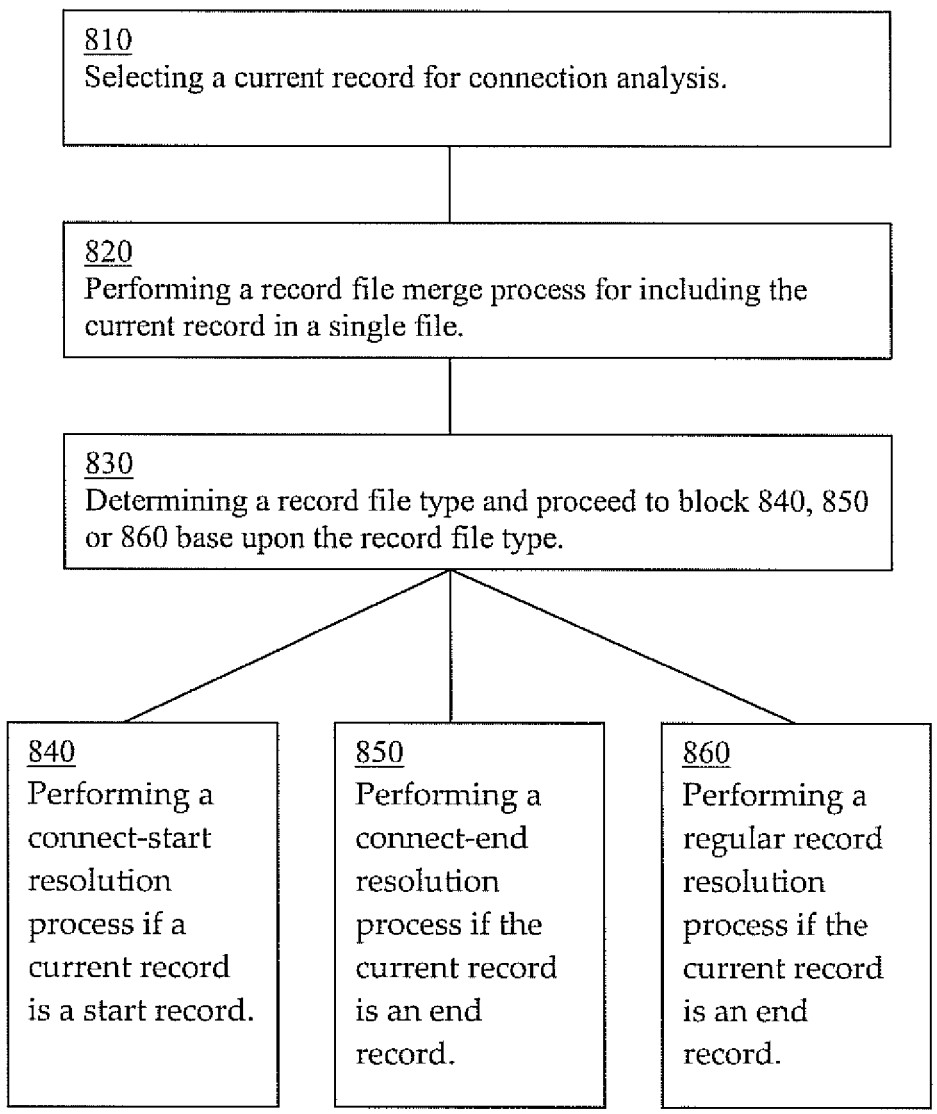
FIG. 8 is a flow chart of an exemplary flow connection process in accordance with an embodiment.

FIG. 8 is a flow chart of an exemplary flow connection process 800 in accordance with an embodiment. Flow connection process 800 is utilized as the flow connection process performed in block 330 in one embodiment.

In block 810, a current record is selected for connection analysis. In one embodiment, the current record with the lowest timestamp among the multiple CPUs is selected for connection analysis. The next record with the next lowest timestamp becomes the current record when the selection process is repeated.

In block 820, a merge process is performed. In one embodiment, a record is copied to a merged file. In one exemplary implementation, each node's multiple CPU files are merged into one file with records in timestamp order. In one exemplary implementation, the file merge process generates one merged file per node.

In block 830, a record file type is determined. In one embodiment, record type indication information in the trace record indicates the type of record. The process proceeds to block 840, 850 or 860 based upon the record file type. If the record file is a connect-start record the process proceeds to block 840. If the record file is a connect-end record the process proceeds to block 850. If the record file is a regular record the process proceeds to block 860.

In block 840, a connect-start resolution process is performed if the current record is a start record. In one embodiment, the connect-start resolution process establishes links with corresponding connect-ends when a connect-start record is the current record. When block 840 is done, the process returns to block 810.

In block 850, a connect-end resolution process is performed if the current record is an end record. In one embodiment, the connect-end resolution process establishes links with corresponding connect-ends and connect-starts when a connect-end record is the current record. When block 850 is done, the process returns to block 810.

In block 860, a regular record resolution process is performed if the current record is a regular record (neither a connect-start nor connect-end). When block 860 is done, the process returns to block 810.

FIG. 9 is a flow chart of connect-start resolution process 900 in accordance with an embodiment. Connect-start resolution process 900 is utilized if the current record (referred hereinafter as record A) is a connect-start record. Connect-start resolution process 900 is utilized as the connect-start resolution process performed in block 840 in one embodiment.

At block 910, a FLOW hash table analysis is performed. In one embodiment, a search of the FLOW hash table for a record with the same thread ID is performed in block 911. If a record is not found the process proceeds to block 920. If a record is found, the process proceeds to block 912 and the found record is removed from the FLOW hash table and then connected to record A using the flow links. The process proceeds to block 920 when block 912 is done.

Figure 14:
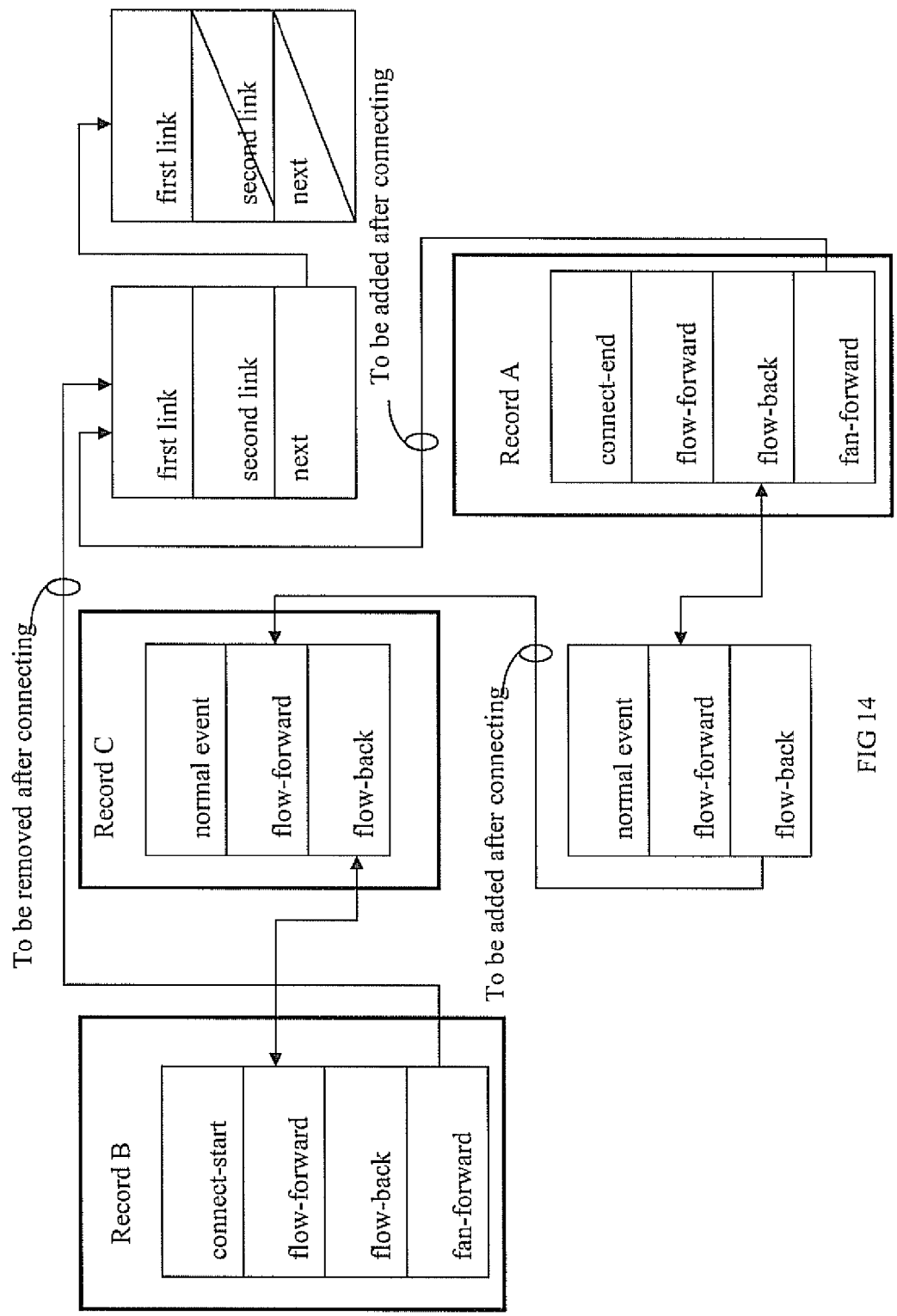
FIG. 14 is a block diagram of exemplary connect-start records in accordance with one embodiment.

In block 920, a START hash table analysis is performed. In one embodiment, a search of the START hash table is performed in block 921 for a connect-start record with the same connect ID. If a record is not found the process proceeds to block 930. If found, the process proceeds to block 922 and the connect-start record (referred hereinafter as record B) is removed from the START hash table. The flow link is followed from the found record to the end of flow. If the end-of-flow record is in the FLOW hash table, remove it (referred hereinafter as record C) from the FLOW hash table and connect it to record A's oldest ancestor with a timestamp newer than record C (if the two are not already connected) using the flow links. Record A now takes over all the fan-forward links from record B. FIG. 14 is an exemplary illustration depicting the process of connecting two connect-start records in accordance with one embodiment.

In block 925, record A is inserted into the START hash table and the FLOW hash table. The process proceeds to block 930.

In block 930 an END hash table analysis is performed. In one embodiment, a search of the END hash table is performed in block 931 for an end-record with the same connect ID. If not found the process proceeds to block 940. If found, the process proceeds to block 932 and connect-end records with matching connect IDs are connected to the record (A) with the fan links. If more than one connect-end records are found, this is a fan out case and they are removed from the END hash table; otherwise it is left alone. When block 932 is done the process proceed to 940.

In block 940, a next record is retrieved. In one embodiment the process returns to a current record selection operation (e.g., block 810).

Figure 10:
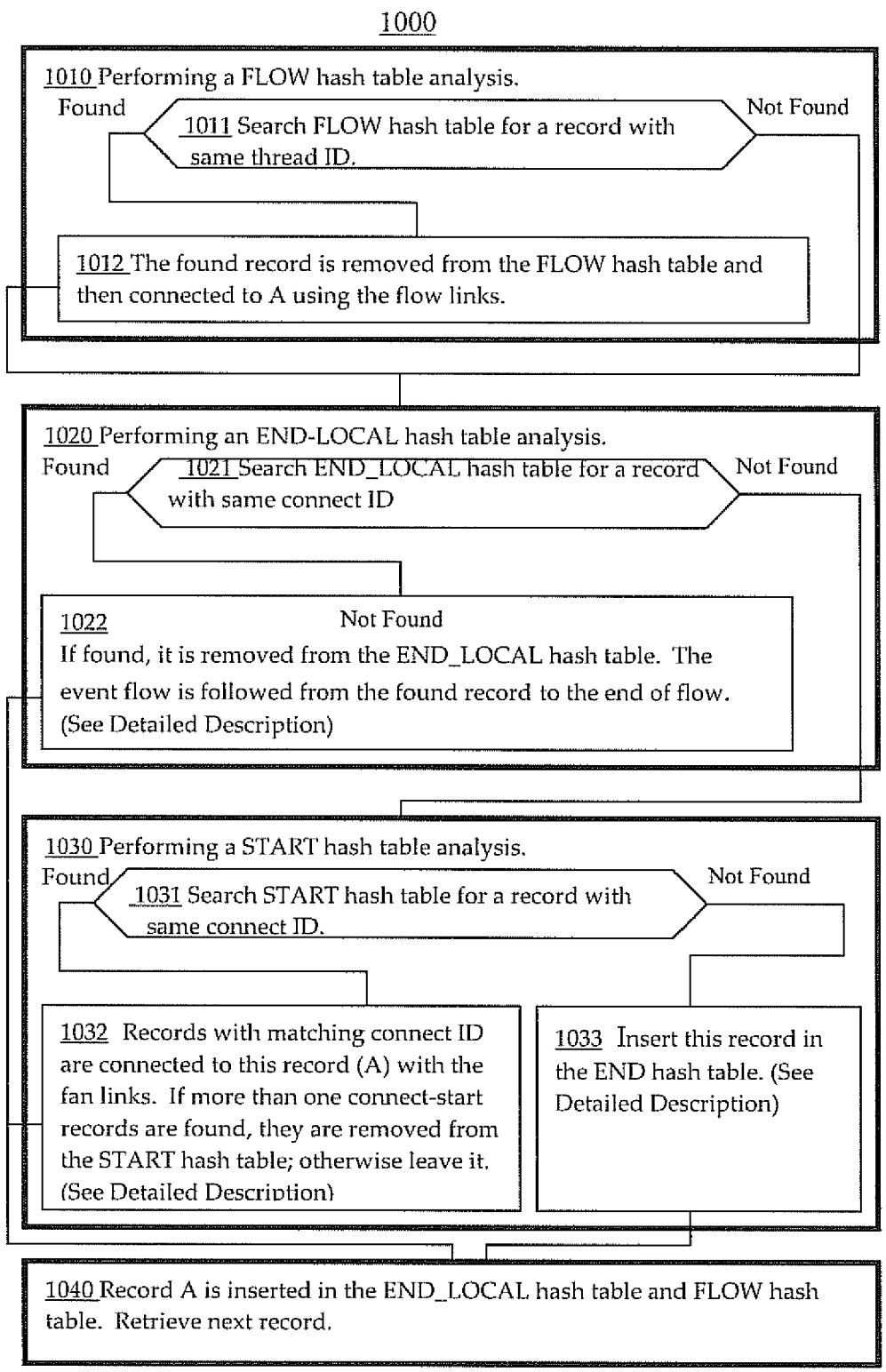
FIG. 10 is a flow chart of connect-end resolution process in accordance with an embodiment.

FIG. 10 is a flow chart of connect-end resolution process 1000 in accordance with an embodiment. Connect-end resolution process 1000 is utilized if the current record (referred hereinafter as record A) is a connect-end record. Connect-end resolution process 1000 is utilized as the connect-end resolution process performed in block 850 in one embodiment.

At block 1010, a FLOW hash table analysis is performed. In one embodiment, a search of the FLOW hash table for a record with the same thread ID is performed in block 1011. If the record is not found the process proceeds to block 1020. If found, the process proceeds to block 1012 and the found record is removed from the FLOW hash table and then connected to A using the flow links. The process proceeds 1020 when block 1012 is done.

In block 1020 an END_LOCAL hash table analysis is performed. In one embodiment, a search in the END_LOCAL hash table is performed in block 1021 for a connect-end record with the same connect ID. If not found, then this is the first connect-end record on this node the process proceeds to block 1030. If found, the process proceeds to block 1022 and it is removed from the END_LOCAL hash table. The event flow is followed from the found record to the end of flow. If the end-of-flow record is in the FLOW hash table it (B) is removed from the FLOW hash table and connected to record A's oldest ancestor with a timestamp newer than record B using the flow links (if the two are not already connected). When block 1022 is done the process proceeds to block 1040.

In block 1030, a START hash table analysis is performed. In one embodiment, the START hash table is searched in block 1031 for the same connect ID. If not found the process proceeds to block 1033. If found, the process proceeds to block 1032 and records with matching connect ID are connected to this record (A) with the fan links. If more than one connect-start record is found, this is a fan in case and they are removed from the START hash table; otherwise leave it. When block 1032 is done the process proceeds to block 1033.

In block 1033 insert the record is inserted in the END hash table. When block 1033 is done the process proceeds to block 1040.

In block 1040, record A is inserted in the END_LOCAL hash table and FLOW hash table. In one exemplary implementation, the next record is retrieved. In one embodiment the process returns to a current record selection operation (e.g., block 810).

Figure 11:
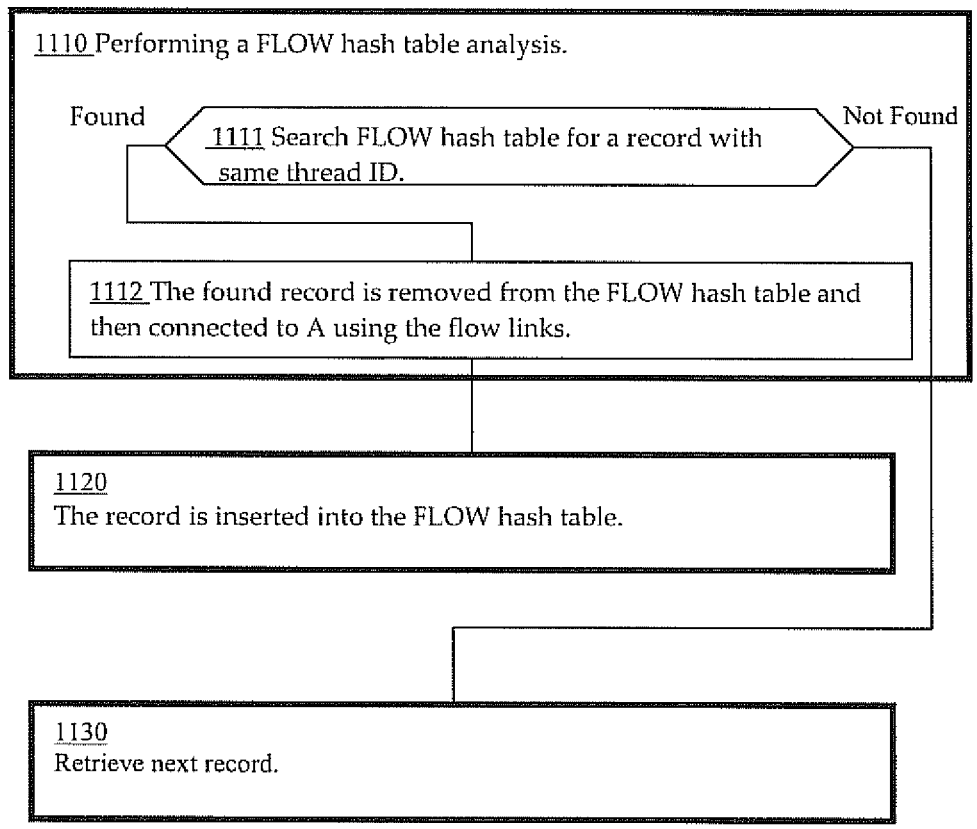
FIG. 11 is a flow chart of regular record resolution process in accordance with an embodiment.

FIG. 11 is a flow chart of regular record resolution process 1100 in accordance with an embodiment. Regular record resolution process 1100 is utilized if the current record (referred hereinafter as record A) is a regular record (e.g., neither connect-start nor connect-end). Regular record resolution process 1100 is utilized as the regular record resolution process performed in block 860 in one embodiment.

In block 1110, a FLOW hash table analysis is performed. In block 1111, a search of the FLOW hash table for a record with the same thread ID is performed. If not found the process proceeds to block 1120. If a record is found the process proceeds to block 1112 and that record is removed from the FLOW hash table and then connected to this record using the flow links. In one embodiment a heuristic can be employed (e.g., if the two records are too far part) to avoid connecting two irrelevant events as part of the same flow. When block 1112 is done the process proceeds to block 1120.

The record is inserted into the FLOW hash table at block 1120. When block 1120 is done the process proceeds to block 1130.

In block 1130 the next record is retrieved. In one embodiment the process returns to a current record selection operation (e.g., block 810).

In one embodiment to facilitate implementation of scaling and handling a large numbers of nodes and large numbers of trace records, the collision chains of the hash tables are maintained in the trace files without using any processor memory by using unused link fields embedded in the records. For example, the flow-forward link of a record is unused until it is connected in a regular flow. While unconnected, this record is placed in the FLOW hash table. If there is a collision in the FLOW hash table in the same bucket the flow-forward field can be used to connect the collision chains.

Figure 15:
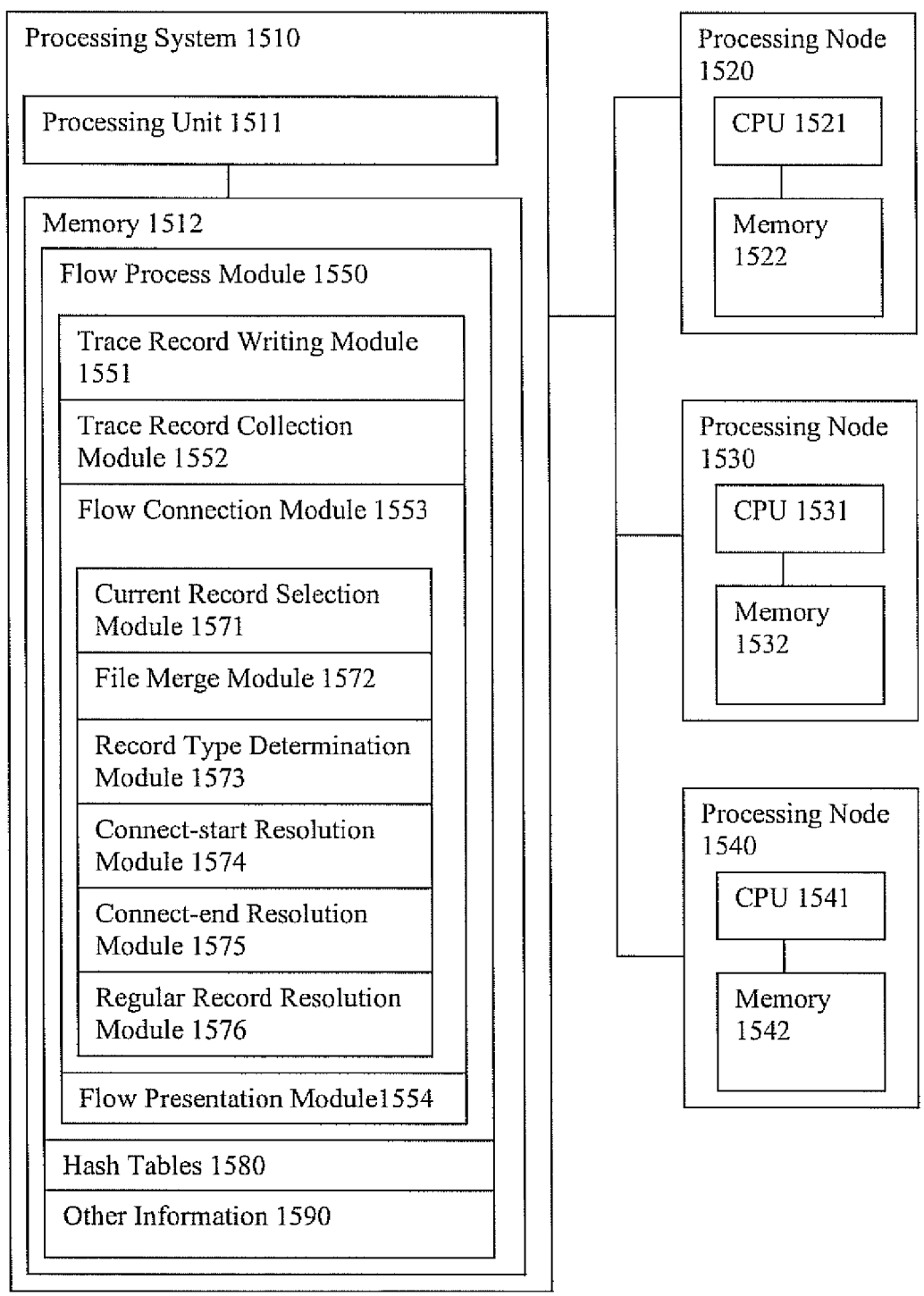
FIG. 15 is a block diagram of system in accordance with an embodiment.

FIG. 15 is a block diagram of system 1500 in accordance with an embodiment. System 1500 includes processing system 1510, processing node 1520, processing node 1530 and processing node 1540. Processing node 1520 through 1540 include CPUs 1521 through 154 and memories 1522 through 1524 respectively. Processing System 1510 includes processing unit 1551 and memory 1512. The memories of system 1500 are computer readable media (e.g., RAM, hard disk, DVD, etc.) with instructions embedded thereon for directing the processing units. Memory 1512 includes flow process module 1550, hash tables 1580 and other information 1590. Flow process module 1550 includes instruction for implementing a flow process method (e.g., 300).

In one embodiment, flow process module 1550 includes trace record writing module 1551, trace record collection module 1552, flow connection module 1553, and flow presentation module 1554. Trace record writing module 1551 includes instructions for creating a trace record (e.g. similar to block 310, etc.). Trace record writing nodule 1551 includes instructions for creating a trace record (e.g. similar to block 310, etc.). Trace record collection module 1552 includes instruction for collecting a trace record type (e.g., similar to block 320, etc.). Flow connection module 1553 includes instructions for performing a flow connection process (e.g., similar to block 330). Flow presentation module 1554 includes instructions for visualizing, searching and traversing a flow process (e.g., similar to block 340).

In one embodiment, flow connection module 1553 includes current record selection module 1571, file merge nodule 1572, record type determination module 1573, connect-start resolution module 1574, connect-end resolution nodule 1575, and regular record resolution module 1576. Current record selection module 1571 includes instructions for selecting a current record (e.g., similar to block 810). File merge nodule 1572 includes instructions for merging records in a file (e.g., similar to block 820). Record type determination module 1573 includes instructions for determining a record type (e.g., similar to block 830). Connect-start resolution module 1574 includes instructions for performing a connect-start resolution process (e.g., similar to block 840). Connect-end resolution module 1575 includes instructions for performing a connect-end resolution process (e.g., similar to connect-end resolution process 850). Regular record resolution module 1576 includes instructions for performing a regular record resolution process (e.g., similar to regular record resolution process 860).

Figure 16:
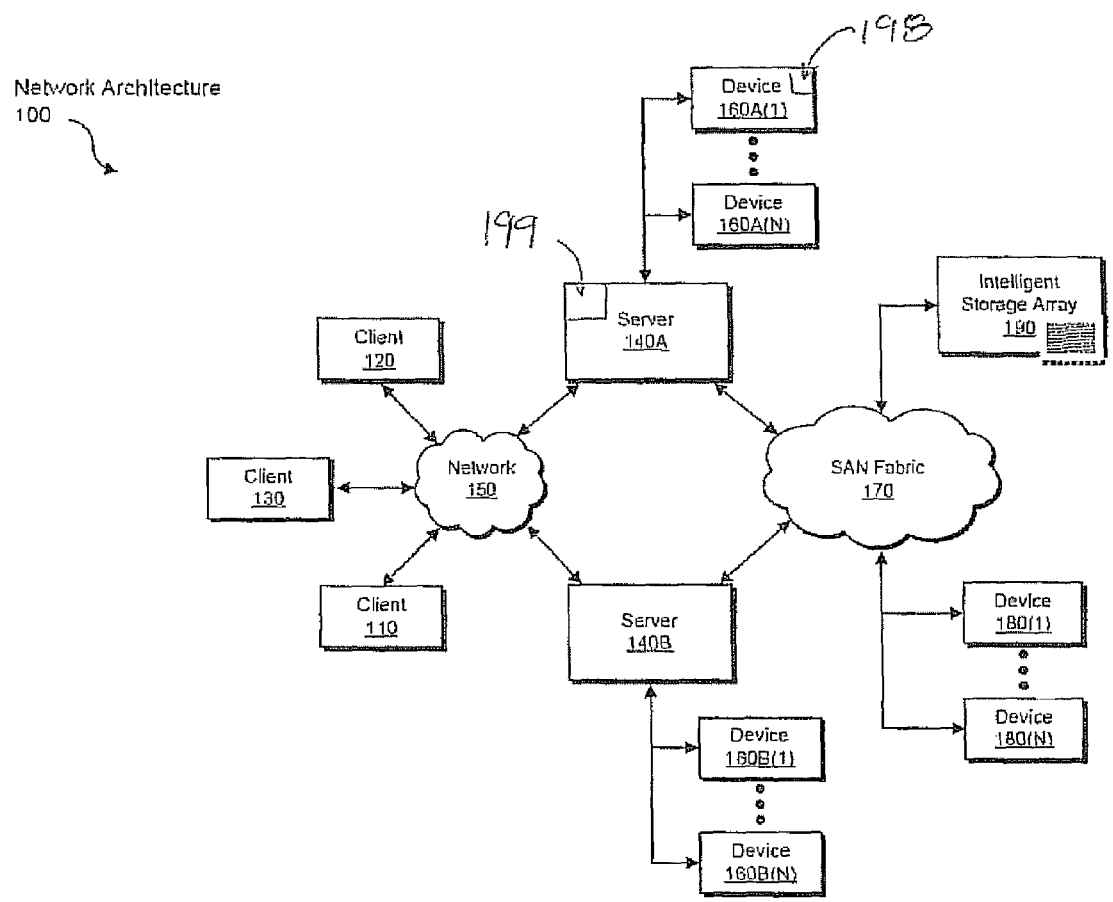
FIG. 16 is a block diagram depicting an exemplary network architecture in accordance with an embodiment.

FIG. 16 is a block diagram depicting a network architecture 1600 in which client systems 110, 120 and 130, as well as storage servers 140A and 140B (any of which can be implemented using computer system 210), are coupled to a network 150. Storage server 140A is further depicted as having storage devices 160A(1)-(N) directly attached, and storage server 140E is depicted with storage devices 160B(1)-(N) directly attached. Storage servers 140A and 140E are also connected to a SAN fabric 170, although connection to a storage area network is not required for operation of the disclosure. SAN fabric 170 supports access to storage devices 180(1)-(N) by storage servers 140A and 140B, and so by client systems 110, 120 and 130 via network 150. Intelligent storage array 190 is also shown as an example of a specific storage device accessible via SAN fabric 170. In one embodiment, server 140A includes flow process module 199. In one embodiment, flow process module 199 is similar to flow process module 1550. It is appreciated that present systems and methods are compatible with a variety of implementations. For example, portions of information (e.g., hash tables, trace records, merge files, etc.) associated with a flow process module 1550 can be distributed in various resources. In one exemplary implementation, information 198 (e.g., hash tables, trace records, merge files, etc.) associated with flow process module 1550 can be included in device 1602.

Figure 17:
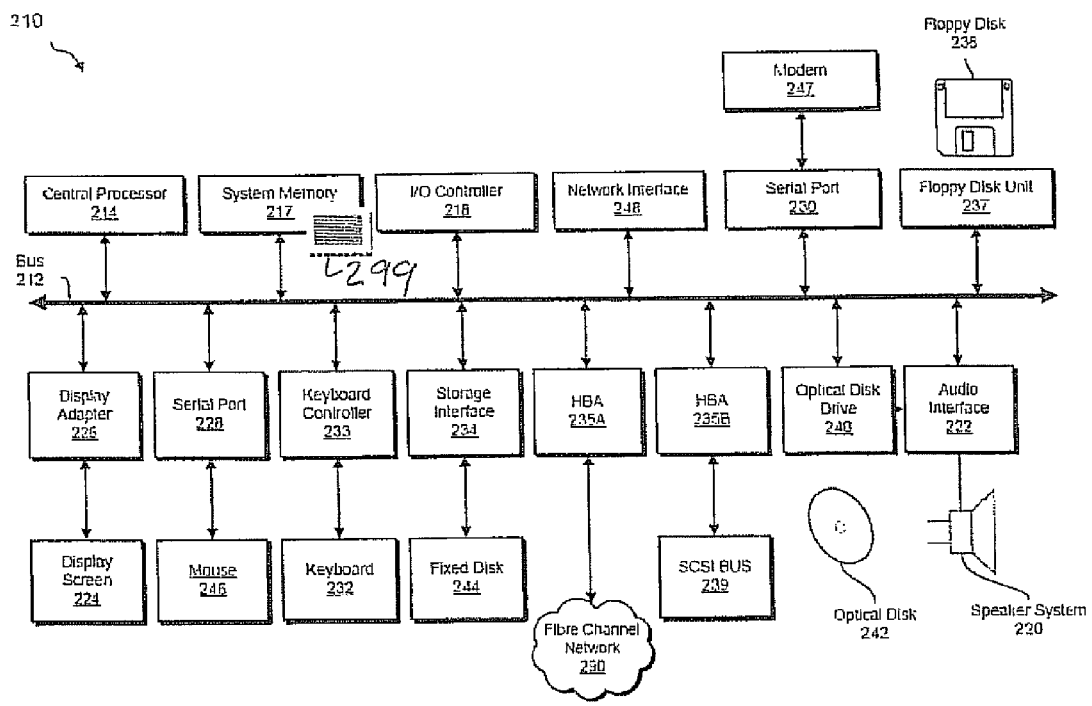
FIG. 17 depicts a block diagram of a computer system suitable for implementing the present disclosure.

FIG. 17 depicts a block diagram of a computer system 210 suitable for implementing the present disclosure. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fiber Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. In one embodiment, RAM 17 includes flow process module 299. In one embodiment, flow process module 299 is similar to flow process module 1550. The ROM or flash memory can contain, among other code, the Basic Input-Output system (BIOS) which controls basic hardware operation such as the interaction with peripheral components. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 210, modem 247, network interface 248 or some other method can be used to provide connectivity from each of client computer systems 110, 120 and 130 to network 150. Client systems 110, 120 and 130 are able to access information on storage server 140A or 140B using, for example, a web browser or other client software (not shown). Such a client allows client systems 110, 120 and 130 to access data hosted by storage server 140A or 140B or one of storage devices 160A(1)-(N), 160B(1)-(N), 180(1)-(N) or intelligent storage array 190. FIG. 1 depicts the use of a network such as the Internet for exchanging data, but the present disclosure is not limited to the Internet or any particular network-based environment.

Figure 18:
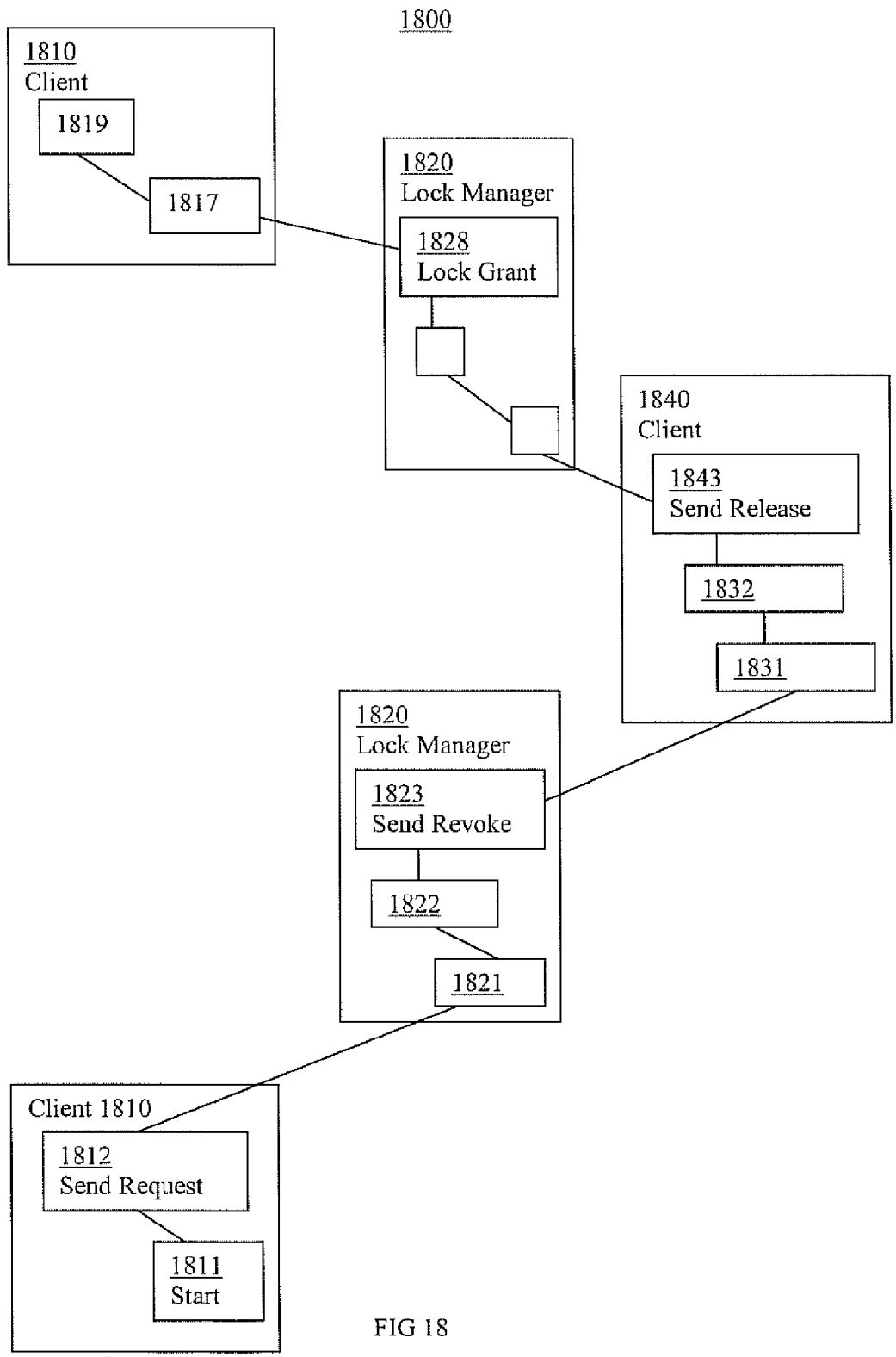
FIG. 18 is a block diagram of a flow presentation in accordance with one embodiment.

FIG. 18 is a block diagram of a flow presentation 1800 in accordance with one embodiment. In one exemplary embodiment, flow presentation 1800 is associated with resource or information lock coordination. The flow starts at point 1811 in client 1810 which sends a lock request message 1812 to lock manager 1820. Lock manager 1820 performs various operations including 1821 and 1822 (e.g., queuing, decoding, etc.) and sends a lock revoke message 1823 to client 1840 which currently holds the lock. Client 1840 performs various operations 1831 and 1832 (e.g., operations associated with the lock resource or information) and then sends a lock release 1843 back to clock manager 1820. Again lock manager 1820 performs various operations and sends a lock grant to client 1810 which can proceed with various operations 1817 and 1819 associated with the lock resource or information.

The present systems and methods facilitate efficient and effective process flow tracking. The flow tracking can be flexibly and incrementally performed for information a user is interested in. The systems and methods facilitate expedited troubleshooting while reducing manual examination of large amounts of complexly related data. The systems and methods also enable enhanced serviceability of numerous products with distributed kernel modules, especially as the size of the cluster of distributed systems scale up or increase. Multiple flows can be simultaneously tracked and brought together. Present systems and methods can also provide presentation of an event indication and additional information associated with an event (e.g., timestamp, etc.).

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media for storing flow modules and instructions for directing a processing in implementing present flow methods and processes. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in modulated data signals such as carrier waves or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. A flow method comprising:
    writing records during program execution, wherein the records include program execution events caused by execution of the program, wherein each of the records is a trace record of a function called during execution of the program, and wherein each trace record comprises an indication of a record file type;
    collecting the written records for post-execution analysis, wherein the written records are associated with a flow;
    performing a flow connection process associated with said flow, wherein said flow connection process determines the record file type for each of the collected records based on the indication of the record file type included in the trace record, determines which of a plurality of flow connection processes to perform based on the determined record file type, examines information in one of a plurality of hash tables according to the selected process and the determined record file type, and connects flow segments within said flow based upon connect IDs within the examined hash table and the determined flow connection process, wherein the flow connection process is performed after the records have been written; and
    performing a presentation process of displaying said flow on a graphical user interface in which said flow is at least one of visualized, searched, and traversed.

2. The flow method of claim 1, wherein the flow connection process utilizes a hash table that draws a correlation between the connect ID and a connect-start record.

3. The flow method of claim 1, wherein the flow connection process utilizes a hash table that draws a correlation between the connect ID and a connect-end record.

4. The flow method of claim 1, wherein said hash table is a FLOW hash table for event records that connect forward to a record in a same node with a same thread ID.

5. The flow method of claim 1, wherein said hash table is an END_LOCAL hash table for a connect-end record that connects forward to another connect-end record in a same node.

6. The flow method of claim 1, wherein said hash table is an END hash table for connect-end records that connect backward to one or more connect-start records in a same or different node.

7. The flow method of claim 1, wherein said hash table is a START hash table for connect-start records that connect forward to one or more connect-end records in a same or different node.

8. The flow method of claim 1, wherein said flow connection process comprises:
  selecting a current record for connection analysis;
  performing a merge process;
  performing a connect-start resolution process to establish a link between corresponding connection-end records when said current record is determined to be a start record;
  performing a connect-end resolution process to establish a link between corresponding connection-end and connection-start records when said current record is determined to be an end record; and
  performing a regular record resolution process when said current record is determined to be a regular record.

9. The flow method of claim 8, wherein a record with a lowest timestamp among multiple CPUs is selected as said current record for connection analysis, and wherein the merge process comprises generating a merged file of records for each of a plurality of nodes that executed the program.

10. The flow method of claim 1, wherein the program execution events are kernel events, wherein the trace record comprises a format field indicating the record file type and a timestamp field indicating a timestamp of the corresponding record, and wherein a node's multiple CPU files are merged into one file with records in timestamp order.

11. A non-transitory computer readable storage medium having stored thereon, computer-executable instructions that when executed by a computing device cause the computing device to perform a method comprising:
  writing records during program execution, wherein the records include program execution events caused by execution of the program, wherein each of the records is a trace record of a function called during execution of the program, and wherein each trace record comprises an indication of a record file type;
  collecting the written records for post-execution analysis, wherein the written records are associated with a flow;
  performing a flow connection process associated with said flow, wherein said flow connection process determines the record file type for each of the collected records based on the indication of the record file type included in the trace record, determines which of a plurality of flow connection processes to perform based on the determined record file type, examines information in one of a plurality of hash tables according to the selected process and the determined record file type, and connects flow segments within said flow based upon connect IDs within the examined hash table and the determined flow connection process, wherein the flow connection process is performed after the records have been written; and
  performing a presentation process of displaying said flow on a graphical user interface in which said flow is at least one of visualized, searched, and traversed.

12. The non-transitory computer readable storage medium of claim 11, wherein the flow connection process utilizes a hash table that draws a correlation between one of the connect IDs and a connect-start record.

13. The non-transitory computer readable storage medium of claim 11, wherein the flow connection process utilizes a hash table that draws a correlation between one of the connect IDs and a connect-end record.

14. The non-transitory computer readable storage medium of claim 11, wherein said hash table is a FLOW hash table for event records that connect forward to a record in a same node with a same thread ID.

15. The non-transitory computer readable storage medium of claim 11, wherein said hash table is an $END_{13}$ LOCAL hash table for a connect-end record that connects forward to another connect-end record in the same node.

16. The non-transitory computer readable storage medium of claim 11, wherein said hash table is an END hash table for connect-end records that connect backward to one or more connect-start records in a same or different node.

17. The non-transitory computer readable storage medium of claim 11, wherein said hash table is a START hash table for connect-start records that connect forward to one or more connect-end records in a same or different node.

18. The non-transitory computer readable storage medium of claim 11, wherein said flow connection process comprises:
  selecting a current record for connection analysis;
  performing a merge process;
  a connect-start resolution process is performed to establish a link between corresponding connection-end records when said current record is determined to be a start record;
  a connect-end resolution process is performed to establish a link between corresponding connection-end and connection-start records when said current record is determined to be an end record; and
  a regular record resolution process is performed when said current record is determined to be a regular record.

19. The non-transitory computer readable storage medium of claim 18, wherein a record with the lowest timestamp among multiple CPUs is selected as said current record for connection analysis, and wherein the merge process comprises generating a merged file of records for each of a plurality of nodes that executed the program.

20. The non-transitory computer readable storage medium of claim 11, wherein the program execution events are kernel events, wherein the trace record comprises a format field indicating the record file type and a timestamp field indicating a timestamp of the corresponding record, and wherein a node's multiple CPU files are merged into one file with records in timestamp order.

21. A system, comprising:
  a computer system having a processor coupled to a computer readable storage media and executing computer readable code which causes the computer system to perform a method of:
    writing records during program execution, wherein the records include program execution events caused by execution of the program, wherein each of the records is a trace record of a function called during execution of the program, and wherein each trace record comprises an indication of a record file type;

collecting the written records for post-execution analysis, wherein the written records are associated with a flow;

performing a flow connection process associated with said flow, wherein said flow connection process determines the record file type for each of the collected records based on the indication of the record file type included in the trace record, determines which of a plurality of flow connection processes to perform based on the determined record file type, examines information in one of a plurality of hash tables according to the selected process and the determined record file type, and connects flow segments within said flow based upon connect IDs within the examined hash table and the determined flow connection process, wherein the flow connection process is performed after the records have been written; and performing a presentation process of displaying said flow on a graphical user interface in which said flow is at least one of visualized, searched, and traversed.

22. The system of claim 21, wherein the flow connection process utilizes hash tables that draw a correlation between the connect ID and a connect-start record.

23. The system of claim 21, wherein the flow connection process utilizes hash tables that draw a correlation between the connect ID and a connect-end record.

24. The system of claim 21, wherein said flow connection process includes selecting a current record for connection analysis;

performing a merge process;

a connect-start resolution process is performed to establish a link between corresponding connection-end records when said current record is determined to be a start record;

a connect-end resolution process is performed to establish a link between corresponding connection-end and connection-start records when said current record is determined to be an end record; and a regular record resolution process is performed when said current record is determined to be a regular record.

25. The system of claim 21, wherein the program execution events are kernel events, wherein the trace record comprises a format field indicating the record file type and a timestamp field indicating a timestamp of the corresponding record, and wherein a node's multiple CPU files are merged into one file with records in timestamp order.

* * * * *